United States Patent [19]

Webbon et al.

[11] 4,095,593
[45] Jun. 20, 1978

[54] COOLING SYSTEM FOR REMOVING METABOLIC HEAT FROM AN HERMETICALLY SEALED SPACESUIT

[75] Inventors: Bruce W. Webbon, San Jose; Hubert C. Vykukal, Los Altos; Bill A. Williams, Morgan Hill, all of Calif.

[73] Assignee: The United States of America as represented by the Administrator of the National Aeronautics and Space Administration, Washington, D.C.

[21] Appl. No.: 753,978

[22] Filed: Dec. 23, 1976

[51] Int. Cl.² .............................................. A62B 7/14
[52] U.S. Cl. .................................... 128/142.7; 62/259
[58] Field of Search ............. 128/142.5, 142.7, 145 R, 128/142.3, 204, 139, 1 A, 1 R, 402, 403, DIG. 27; 2/2.1 R, 2.1 A; 62/259, 298; 165/40; 61/70 R

[56] References Cited

U.S. PATENT DOCUMENTS

| | | | |
|---|---|---|---|
| 3,049,896 | 8/1962 | Webb | 128/142.5 |
| 3,079,765 | 3/1963 | LeVantine | 128/402 |
| 3,289,748 | 12/1966 | Jennings | 62/259 |
| 3,345,641 | 10/1967 | Jennings | 128/142.5 |
| 3,500,827 | 3/1970 | Paine | 128/142.5 |
| 3,608,091 | 9/1971 | Olson et al. | 2/2.1 R |
| 3,830,676 | 8/1974 | Elkins | 128/403 |

Primary Examiner—Robert W. Michell
Assistant Examiner—Henry J. Recla
Attorney, Agent, or Firm—Darrell G. Brekke; John R. Manning; Armand McMillan

[57] ABSTRACT

An improved cooling and ventilating system for removing metabolic heat, waste gases and water vapor generated by a wearer of an hermetically sealed spacesuit. The cooling system is characterized by a body suit having a first circuit for simultaneously establishing a cooling flow of water through the thorax and head sections of the body suit including circulation patches mounted in the thorax section and head section of the body suit, a second circuit for discharging a flow of gas throughout the spacesuit and a disconnect unit for coupling the circuits with a life support system externally related to the spacesuit.

1 Claim, 8 Drawing Figures

U.S. Patent June 20, 1978 Sheet 3 of 3 4,095,593
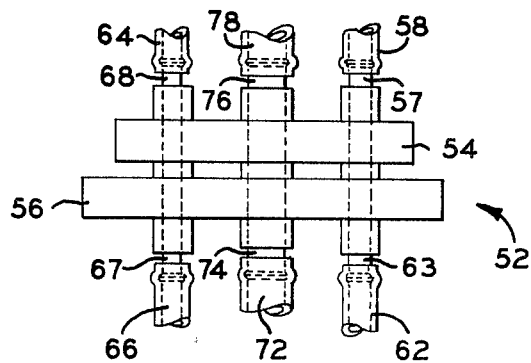
Fig. 6
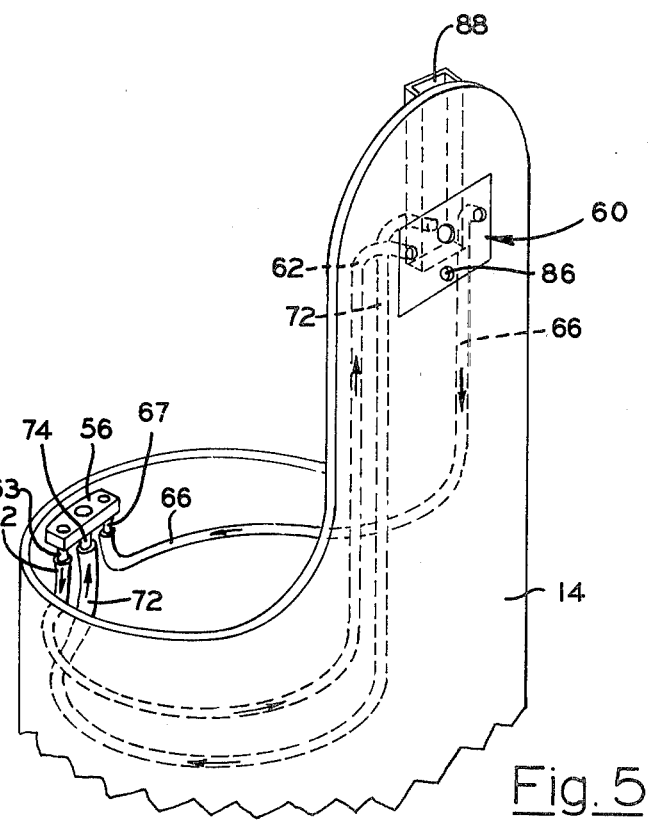
Fig. 7
Fig. 5
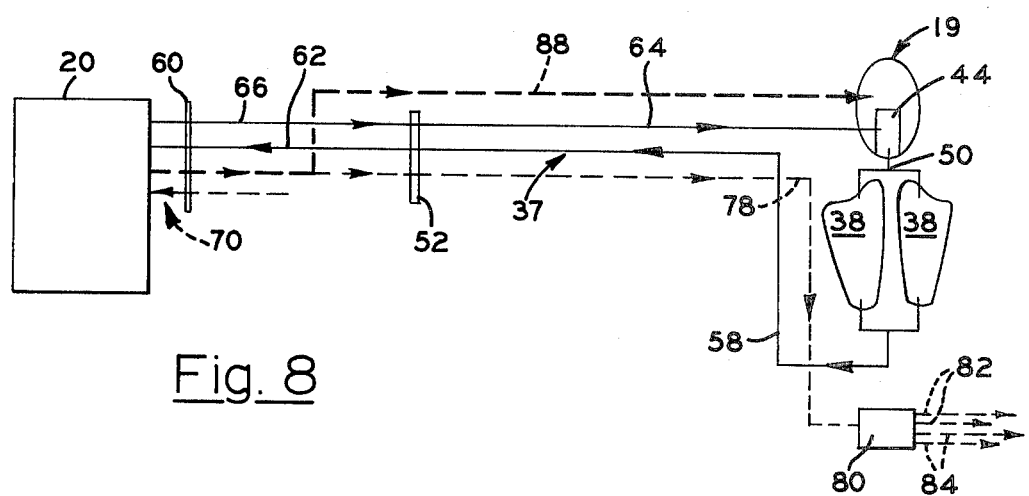
Fig. 8

COOLING SYSTEM FOR REMOVING METABOLIC HEAT FROM AN HERMETICALLY SEALED SPACESUIT

The invention described herein was made by employees of the United States Government and may be manufactured and used by or for the government for governmental purposes without the payment of any royalties thereon or therefor.

BACKGROUND OF THE INVENTION

1. Field of the Invention

The invention generally relates to cooling and ventilating systems for pressure suits and more particularly to an improved cooling and ventilating garment particularly suited for use in removing metabolic heat, waste gases and water vapor from an hermetically sealed outer suit, hereinafter referred to as a spacesuit.

2. Description of the Prior Art

The prior art includes teachings of numerous approaches to the problem of achieving removal of metabolic heat and gaseous wastes generated by a wearer of an hermetically sealed spacesuit. For example, it has been common practice to sew into undergarments for spacesuits cooling circuits including flexible liquid circulating tubes and liquid circulation patches, as well as to employ ventilation systems of numerous configurations for removing waste gases and water vapor from the suit.

In the Apollo/Skylab programs, a cooling unit made of elastomeric material having attached thereto a network of flexible tubes for accommodating circulation of water was employed. The head of the astronaut, hereinafter referred to as a wearer, was not covered and all ventilation gases were fed to the helmet and collected in a return vent system attached to the suit. The cooling system required that a high flow rate of 240 pounds per hour, with temperatures as low as 42° F, be established through the suit in order to remove most of the metabolic heat generated by the wearer. It has been found that the gas circulation systems heretofore employed generally tend to be ineffective in removing perspiration, since the gas becomes substantially saturated with moisture as it exits the helmet of the spacesuit and flows out over the body of the wearer. Moreover, since the entire quantity of gas must be delivered to the suit through small ducts, relatively large pressure drops are experienced when employing such systems. Finally, the tubes heretofore employed in venting spacesuits must be loosely attached to the suit with considerable excess being provided in order to accommodate motion in the region of the joints of the spacesuit. Use of excessive lengths of tubing, of course, tends to increase bulk and is attended by a liklihood that the tubing will experience a collapse, particularly near the mobility joints of the spacesuit.

It is therefore the general purpose of the instant invention to provide in combination with an hermetically sealed spacesuit an improved cooling garment of reduced bulk and complexity, particularly suited for use in removing metabolic heat, waste gases and water vapor from the suit with increased efficiency.

OBJECTS AND SUMMARY OF THE INVENTION

It is an object of the invention to provide for use in a pressure suit an improved cooling and ventilating system.

It is another object of the invention to provide for use in an hermetically sealed pressure suit characterized by a bulbous helmet affixed to a rigid thorax section of a tubular configuration an improved cooling and ventilating system.

It is another object to provide in combination with an hermetically sealed spacesuit an improved cooling and ventilating system for removing metabolic heat and gaseous wastes generated by a wearer thereof.

It is another object to provide for use in combination with an hermetically sealed spacesuit an improved cooling garment including a network of liquid conduits through which a cooling liquid is circulated about the head and thorax of a wearer, and a circuit for circulating a ventilating flow of gas through the suit, including a network of ducts having discharge orifices located near the head and extremities of the wearer for discharging a flow of gas across the head to the oro-nasal area and along the limbs to the torso region of the wearer.

Another object is to provide an improved cooling and ventilating system particularly suited for use in combination with a spacesuit, although not necessarily restricted in use thereto, since the system may be employed for removing metabolic heat and gaseous wastes from hermetically sealed suits adapted to be utilized in a terrestrial environment.

These, together with other objects and advantages, are achieved through a use of a cooling and ventilating system including an elastomeric body suit adapted to be donned by a wearer of a spacesuit, and having affixed thereto a first circuit network for establishing a cooling flow of water through the body suit and a second circuit network for establishing a flow of gas throughout the spacesuit, as will hereinafter become more readily apparent by reference to the following description and claims in light of the accompanying drawings.

IN THE DRAWINGS

FIG. 5 is a fragmented perspective view of a lower thorax section of the spacesuit shown in FIGS. 1 and 2, illustrating plumbing employed in the system of the instant invention.

FIG. 6 is a front elevational view of a quick disconnect unit employed in coupling the body suit shown in FIGS. 2 and 3 with the thorax section shown in FIG. 5.

FIG. 7 is a fragmented view of a helmet section for the spacesuit shown in FIG. 1, illustrating a helmet duct through which gas is discharged across the head to the oro-nasal zone of a wearer thereof.

FIG. 8 is a diagrammatic view of a cooling and ventilating system which embodies the principles of the instant invention.

DETAILED DESCRIPTION OF THE PREFERRED EMBODIMENT

Figures 1, 2:
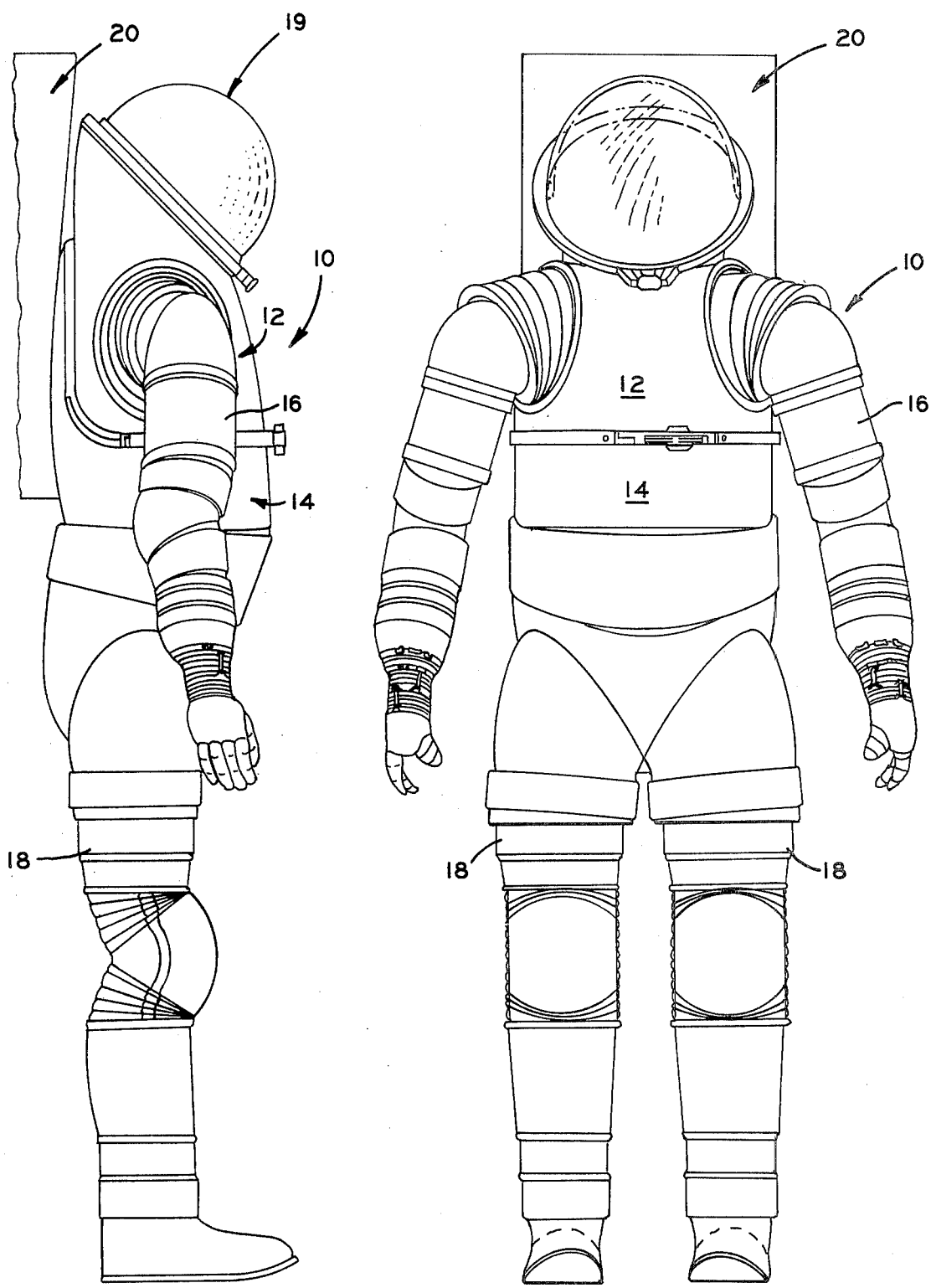
FIG. 1 is a side elevational view of a spacesuit equipped with an improved cooling and ventilating system embodying the principles of the instant invention.
FIG. 2 is a front elevational view of the spacesuit shown in FIG. 1.

Referring now to the drawings, with more particularity, wherein like reference characters designate like or corresponding parts throughout the several views, there is depicted in FIG. 1 and FIG. 2 a spacesuit 10 equipped with a cooling system embodying the principles of the instant invention.

As shown in the drawings, the spacesuit 10 includes a thorax section comprising an upper thorax section and a lower thorax section, designated 12 and 14 respectively. Appendages 16 and 18 are provided for receiving the limbs of a wearer. The upper and lower thorax sections preferably are formed of a suitable rigid material and are of a generally tubular configuration. A bulbous helmet 19 is attached to the upper thorax section 12 of the suit 10, while upon the back of the spacesuit 10, there is mounted a life support system, generally designated 20.

It is important to appreciate that the spacesuit 10 and the life support system 20 form no specific part of the instant invention, other than to serve as an outer suit and a source of reconditioned fluids, respectively. Therefore, a detailed description of the spacesuit and the life support system 20 is omitted in the interest of brevity.

Figures 3, 4:
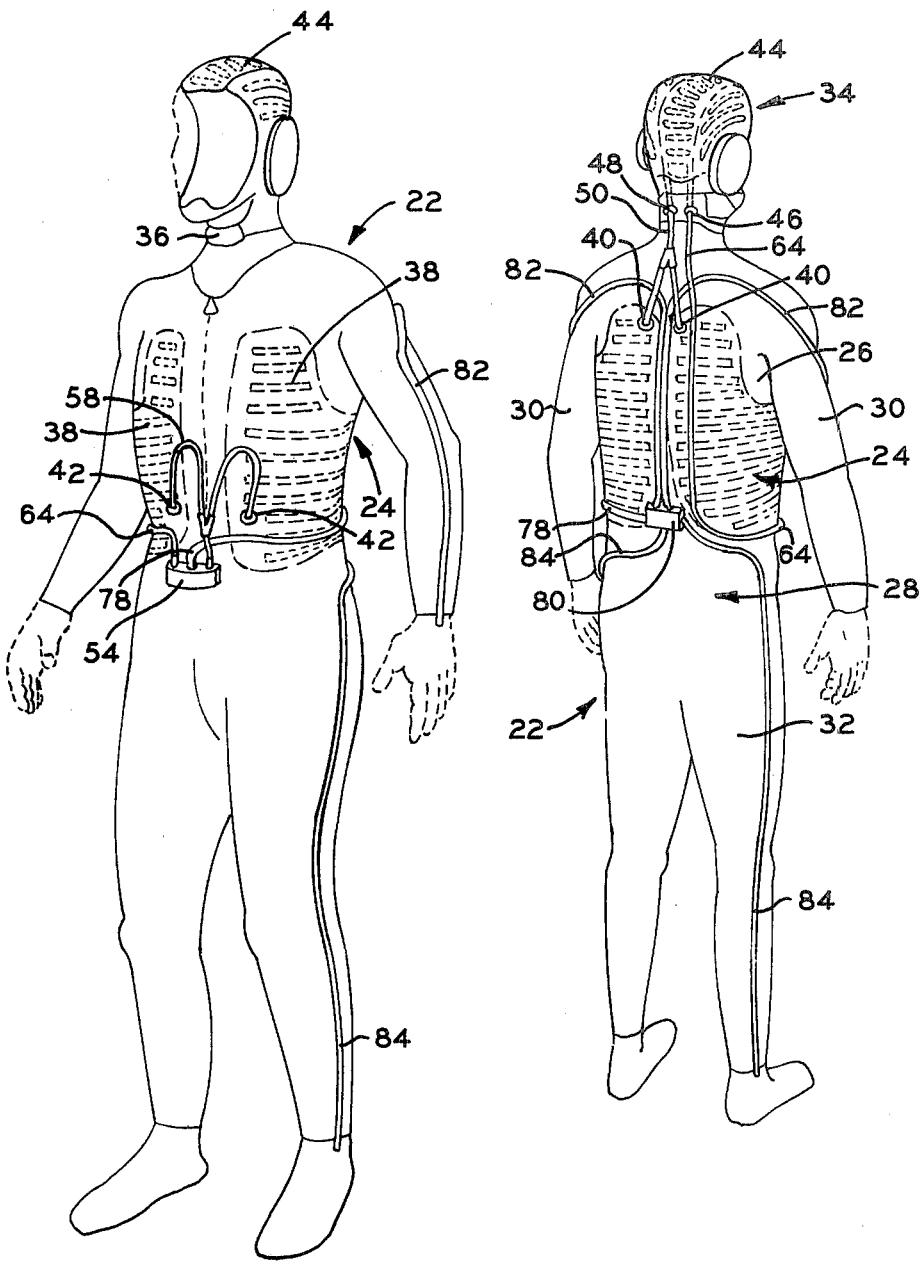
FIG. 3 is a perspective elevational view of a cooling garment comprising a body suit for supporting a cooling and ventilating system which embodies the principles of the instant invention.
FIG. 4 is a rear elevational view of the body suit shown in FIG. 3.

Turning now to FIGS. 3 and 4, therein is illustrated a cooling garment including a body suit, generally designated 22, which embodies the principles of the instant invention. The body suit 22, as a practical matter, comprises a support garment of a loosely woven elastomeric material frequently referred to as "loose weave elastic spandex fabric". This material stretches quite easily and thus accommodates substantially unrestricted movement of the wearer. However, it is to be understood that the particular material from which the body suit 22 is fabricated may be varied as desired, so long as the body suit may be donned by a wearer and employed as a support for the system.

As shown in the drawings, the body suit 22 includes an upper torso region, generally designated 24, which forms a thorax section 26 for the suit 22, and a lower torso region, designated 28. Upper limb sections 30 and lower limb sections 32 are provided as an integral part of the body suit 22. The upper limb sections 30 serve to receive the arms of a wearer with the hands, hereinafter referred to as extremities, exposed. Similarly, the lower limb sections 32 serve to receive the legs of a wearer with the extremities of the legs, or feet, being projected therefrom.

As also shown in the drawings, the body suit 22 further includes a head section 34. This section is integrally related with the torso region 24 and is of a configuration conforming substantially to a close-fitting, flexible helmet. Straps 36 are provided for securing the head section in place. As a practical matter, the straps 36 are adapted to close over the zone of the throat and/or chin of a wearer and suitable fasteners such as Velcro or the like are utilized for joining the adjacent ends of the straps.

Liquid Circulating Circuit

Incorporated in the body suit 22 there is a liquid circulating circuit 37, FIG. 8. The purpose of the circuit is to transport metabolic heat, generated by a wearer, away from the spacesuit 10.

The circuit 37 includes a pair of circulating patches 38 affixed to the thorax section 26 of the suit 22. The patches 38, as a practical matter, comprise liquid circulating patches of the type more fully disclosed in the aforementioned United States Letters Pat. No. 3,830,676. These patches are formed by superimposing flat sheets of flexible material and sealing the sheets together in selected zones for forming chambers having passageways extending therebetween through which the chambers communicate.

Since the patches 38 are of known design and are well understood, a detailed description thereof is omitted in the interest of brevity. It suffices to understand that each of the patches 38 is included in the circuit 37 at an inlet port 40 and an outlet port 42, and that these ports serve to accommodate ingress and egress of a cooling liquid, such as water or the like, as the liquid is caused to flow through the circuit. The liquid is caused to flow between the inlet and outlet ports 40 and 42, respectively, for purposes of absorbing and transporting metabolic heat away from the suit, as will hereinafter become more readily apparent.

Similarly, the head section 34 is provided with a liquid circulating patch 44 fabricated in substantially the same manner as are the liquid circulating patches 38. The circulating patch 44, however, is configured to cover the top and rear, as well as the temple areas, of a wearer's head and includes an inlet port 46 and an outlet port 48, disposed in spaced communication.

As a practical matter, the outlet port 48 is connected through a bifurcated length of tubing 50 with the inlet ports 40 of the pair of circulating patches 38. Thus a cooling liquid introduced into the inlet port 46 of the circulating patch 44 is discharged therefrom through the outlet port 48 to the inlet ports 40 of the circulating patches 38. It should, therefore, be apparent that a cooling liquid, such as water, introduced into the body suit 22 through the inlet port 46 of the circulating patch 44 will exit the outlet ports 42 of the liquid circulating patches 38 as it is coursed along its return path to the life support system.

In order to accommodate delivery and discharge of a cooling liquid, with respect to the body suit 22, there is provided a quick disconnect unit, generally designated 52, FIG. 6.

The disconnect unit 52, as shown, includes a body component 54 mounted on the body suit 22, and a suit component 56 mounted on the lower thorax section 14 of the spacesuit 10, FIG. 5. As a practical matter, the disconnect unit 52 is of any suitable design which forms no specific part of the instant invention. However, it is to be understood that the components 54 and 56 are suitably mounted on the body suit and spacesuit, and include suitable male and female couplings, not shown, as well as spring loaded poppet valves. Such valves are well known and serve to afford a "quick disconnect" of the circuit in a manner well understood by those familiar with the design and fabrication of circuits for spacesuits and the like.

As shown in the drawings, each of the outlet ports 42 is connected with the quick disconnect unit 52, at a discharge nipple 57, through a bifurcated length of flexible tubing 58. This length of tubing is extended from each of the outlet ports 42 and is received by the nipple 57, FIG. 6. The suit component 56 of the unit 52 is, in turn, connected with a suitable junction plate, generally designated 60, provided at the upper rear of the lower thorax section 14 of the spacesuit 10. The connection is made through a length of flexible tubing 62 attached to the plate 60 as well as to a nipple 63 of the suit component, and coursed about the internal periphery of the thorax section 14 of the spacesuit 10. The tubing 62 is suitably secured to the spacesuit in order to accommodate movement of a wearer thereof. Hence, it should be understood that water, or other liquid, introduced into the liquid circulating patches at the inlet ports 40 ultimately is delivered to the junction plate 60 for discharge to a circuit, not designated, located within the life support system 20.

The suit component 56 of the disconnect unit 52 also is connected with the junction plate 60 through a length of flexible tubing 66. This length of tubing has one end suitably connected with the junction plate 60 while the opposite end thereof is connected with a nipple 67 projected downwardly from the suit component 56. The flexible tubing 66, like the flexible tubing 62, is coursed about the internal periphery of the thorax section 14 and is secured in place for purposes of accommodating movement of a wearer of the suit.

Consequently, it should be apparent that a cooling liquid, such as water or the like, is supplied by the life support system 20 and delivered to the circulating patch 44, via the lengths of flexible tubing 66 and 64. The thus delivered cooling liquid then exits the circulating patch 44 and is caused to flow to the liquid circulating patches 38, via the bifurcated tubing 50. Ultimately, the cooling liquid is discharged to the life support system 20 via the lengths of tubing 58 and 62 connected in communication by the disconnect unit 52.

In view of the foregoing, it should be apparent that the disconnect unit 52 serves as a suitable coupling for selectively completing and interrupting the liquid circulating circuit in a manner consistent with that which characterizes disconnect couplings.

Gas Circulating Circuit

Within the spacesuit 10 there is included a gas circulating circuit, generally designated 70, FIG. 8. The purpose of this circuit is to deliver dry, consumable gas to the spacesuit 10 and to conduct gaseous wastes therefrom, as perspiration and exhalation occur.

The circuit 70 also is connected with the life support system 20 through the junction plate 60, aforementioned. To the junction plate 60 there is connected a delivery conduit 72, formed of a length of flexible tubing, which is extended from the junction plate 60 and connected with the suit component 56 at a downwardly projected nipple 74, FIG. 6. The nipple 74 communicates with a nipple 76, projected upwardly from the body component 54 of the disconnect unit 52, from which there is extended a length of flexible tubing 78. This length of tubing is connected with a manifold 80 mounted on the body suit 22 at a suitable location. While the manifold 80 is illustrated as being positioned in the lumber region of a wearer's back, it is to be understood that the manifold may be positioned at any suitable location, such as over the hip zone of a wearer, where desired.

The manifold 80 is of a suitable design having a capability of dividing an incoming stream of gas into four components of substantially equal volumes and pressures. Since such manifolds are well known, and the specific structure of the manifold 80 forms no part of the instant invention, a detailed description thereof is omitted in the interest of brevity.

From the manifold 80 there is extended a first pair of conduits 82 which pass along the outer surfaces of the upper limb sections 30 of the body suit 22. These conduits also are formed of a flexible material and terminate at discharge orifices, not designated, disposed in close proximity with the extremities of a wearer, as best illustrated in FIG. 3. Similarly, from the manifold 80 there is extended a second pair of conduits 84 which pass downwardly along the outer surfaces of the lower limb sections 32 and terminate at a discharge orifice, not designated, located above the lower extremities, or feet, of a wearer, as illustrated in FIGS. 3 and 4.

It should be appreciated that the conduits 82 and 84 are attached in any suitable manner to the body suit 22. Fasteners, including clips anchored in pads may be employed where desired. Since the particular manner in which the conduits are secured may be varied as desired, and the specific manner in which they are mounted forms no specific part of the instant invention, a more detailed description of the mounting of the conduits 82 and 84 is omitted.

The purpose of the conduits 82 and 84 is to discharge streams of gas near the extremities of a wearer, and thus permit the gas to return upwardly through the appendages 16 and 18 of the suit 10 along the external surfaces of the limb sections of the body suit 22. These streams ultimately merge within the cavity of the torso of the suit 10 and progress to a gas exhaust duct 86 located in the junction plate 60. The duct 86 communicates with the interior of the spacesuit 10 and is connected with an exhaust unit, not shown, incorporated in the life support system 20. As should be apparent, the streams of gas serve to evaporate perspiration formed on the limbs and torso of the wearer, and thus cool the wearer. Of course, the resulting water vapor is transported away from the suit 10.

In addition to the conduits 82 and 84, there is provided a helmet duct 88 which serves to flush the helmet 19, in a continuous fashion, with consumable or life-supporting gas. It is to be understood that the helmet duct 88 also includes an orifice, not shown, positioned near the rear of the head section of the body suit 22 and serves to discharge a continuous stream of gas into the interior of the helmet. This stream sweeps over the head section of the body suit 22 and envelopes the oro-nasal region of the wearer. The gas thus discharged into the helmet 19 ultimately is permitted to pass downwardly into the cavity of the torso of the spacesuit 10 and merge with the gas returning from the appendages 16 and 18, prior to its being drawn from the suit via the exhaust duct 86, aforementioned.

It should, therefore, be apparent that the helmet duct 88 serves to direct a flow of dry gas across the head section of the body suit for purposes of supplying oxygen-laden gas to be consumed by inhalation, while simultaneously removing waste gases and water vapor from the helmet 19 as a resulting flushing occurs.

OPERATION

It is believed that in view of the foregoing description, the operation of the device will readily be understood and it will be briefly reviewed at this point.

The body suit 22 initially is donned by a wearer and secured in place utilizing strategically supported fasteners such as zippers and the like, not designated. The liquid circulating patches 38 and 44 are connected, through lengths of tubing 58 and 50, respectively, with the body component 54 of the disconnect unit 52. When arranged in place, the conduits 82 and 84 extend along the outer surfaces of the upper and lower limb sections 30 and 32, respectively. Once the body suit is properly positioned, the wearer dons the spacesuit 10 and connects the components 54 and 56 of the unit 52 for thus connecting the tubing 58 with the length of tubing 62, the length of tubing 78 with the tubing forming the conduits 72, and the length of tubing 64 with the length of tubing 66. Thus the lengths of tubing 64, 58, and 78 are connected to the junction plate 60.

The life support system 20 is attached to the rear of the spacesuit with a suitable connection being effected between the life support system and the junction plate 60 for thus connecting the circuits 37 and 70 with circuits of the life support system 20.

A liquid coolant, such as water or other suitable cooling liquid, is introduced into the cooling system via the lengths of tubing 66 and 64. The liquid now enters the circulating patch 44 of the head section 34 of the body suit 22. The liquid exits the circulating patch 44 and enters the circulating patches 38, simultaneously. From the circulating patches 38, the liquid is permitted to exit the circulating circuit 37, via the lengths of tubing 58 and 62. Upon exiting the circuit 37, the liquid carries with it metabolic heat absorbed from the body of the wearer, particularly within the patches 38 and 44. The heat thus transported away from the body is dissipated within the life support system 20 in a suitable manner forming no part of the instant invention.

Simultaneously with the circulation of a liquid coolant through the circuit 37, oxygen-laden gas is introduced into the suit via the conduit 72 and the helmet duct 88. As the air enters the spacesuit 10, via the junction plate 60, a portion thereof is delivered through the tubing 78, via the disconnect unit 52, to the manifold 80. Upon being introduced into the manifold 80, the gas is divided into four streams and caused to flow through the pairs of conduits 82 and 84 along the outer surfaces of the limb sections of the body suit 22 to be discharged near the extremities of the wearer of the spacesuit 10. Upon being discharged from the pairs of conduits, the gas moves through the appendages 16 and 18, toward the torso of the spacesuit, evaporating perspiration and the like. This gas ultimately flows to the gas exhaust duct 86 located in the junction plate 60. Of course, the gas is there extracted from the spacesuit 10 taking with it undesirable gaseous wastes absorbed and mixed therewith.

Simultaneously, a relatively large quantity of dry gas, a quantity considerably greater than that delivered to the manifold 80, is directed through the helmet duct 88 and discharged into the helmet 19 at the rear of the head section of the body suit 22 for simultaneously supplying the wearer with consumable life-supporting gases, while sweeping perspiration and waste gases from the helmet 19. As the water vapor and waste gases are swept from the helmet, they are caused to mingle with the gas returning from the appendages 16 and 18 of the suit 10, whereupon the merged gases are exhausted at the gas exhaust duct 86 at the junction plate 60.

In view of the foregoing, it should readily be apparent that the cooling system which embodies the principles of the instant invention provides a practical solution to the problems os supplying suitable quantities of liquid coolants and gas to hermetically sealed spacesuits for simultaneously removing metabolic heat and gaseous wastes.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. In combination with a hermetically sealed spacesuit including a bulbous helmet affixed to a thorax section of a rigid, tubular configuration, an improved cooling system for removing metabolic heat and gaseous wastes generated by a wearer comprising:

an elastomeric body suit including a thorax section, leg sections, arm sections and a head section adapted to be donned by a wearer and received within said spacesuit;

a quick disconnect unit having a first section mounted on said spacesuit interior in reach of said wearer and a second section mounted on said body suit and adapted to be mated in a releasably coupled relationship with said first disconnect section, said first section having first and second inputs and an output mating with first and second outputs and an input, respectively, on said second section;

circuit means for channeling a flow of water through the thorax section and the head section of said body suit, said circuit means coupled between said first outlet and said inlet of said second section of said disconnect unit;

said spacesuit having a water inlet orifice, a water outlet orifice, a gas inlet orifice, and a gas outlet orifice grouped in said thorax section, said orifices being adapted to link to a life support system external to said spacesuit;

means for ducting gas from said gas inlet orifice to the interior of said helmet and to said second inlet of said first section of said disconnect unit;

means for ducting water from said water inlet orifice to said first input of said first section of said disconnect unit and for ducting water from said output of said first section to said water outlet orifice;

a gas distribution network comprising a manifold mounted on said body suit and a flexible conduit connecting said manifold to said second outlet of said second section of said disconnect unit; and flexible tube means secured to said body suit for channeling gas from said manifold to all arm and leg extremities of the wearer.

* * * * *